J. M. LONG AND A. U. AND C. A. BRYANT.
LOCKING DEVICE FOR AUTOMOBILE TIRE CHAINS.
APPLICATION FILED OCT. 6, 1919.

1,409,014.

Patented Mar. 7, 1922.

Inventors
J. M. Long; A. U. Bryant, and
C. A. Bryant.

By H. L. Woodward
Attorney

UNITED STATES PATENT OFFICE.

JACOB M. LONG, OF MOUNT AIRY, NORTH CAROLINA, AND ASA U. BRYANT, AND CHARLES A. BRYANT, OF CUMBERLAND, VIRGINIA.

LOCKING DEVICE FOR AUTOMOBILE TIRE CHAINS.

1,409,014.  Specification of Letters Patent.  Patented Mar. 7, 1922.

Application filed October 6, 1919. Serial No. 328,861.

*To all whom it may concern:*

Be it known that we, JACOB M. LONG, ASA U. BRYANT, and CHARLES A. BRYANT, citizens of the United States, said LONG being a resident of Mount Airy, in the county of Surry, State of North Carolina; said ASA U. BRYANT and CHARLES A. BRYANT being residents of Cumberland, in the county of Cumberland, in the State of Virginia, have invented certain new and useful Improvements in Locking Devices for Automobile Tire Chains, of which the following is a specification.

The invention has for an object to provide a new and desirable form of locking link by which the ends of tire chains may be connected together upon a tire with a minimum liability of casual disconnection, and which will be simple to manipulate. A further aim is to provide a device of this character having a novel locking means which will be liable in a minimum degree to casual operation incident to ordinary use, but which may be easily manipulated for disengagement at any time without the use of special tools. A further aim is to enable the manufacture of a device of this character in an economical manner.

Additional objects, advantages and features of invention will appear from the construction, arrangement and combination of parts hereinafter described and shown in the drawings, wherein, Figure 1 is a fragmentary view of a tire provided with chains having our device applied thereto, Fig. 2 is a detail sectional view of our locking device, Fig. 3 is a detail side elevation of the device partly open.

Figure 2:
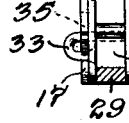
Figure 3:
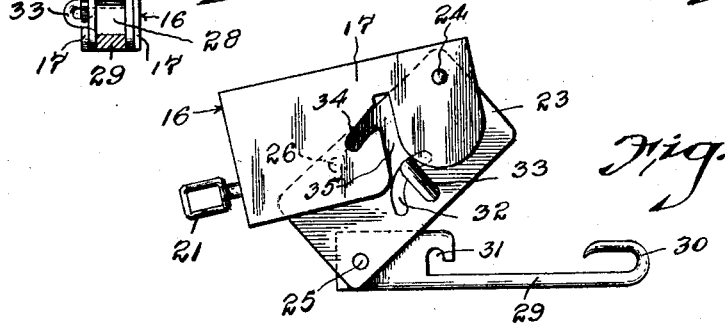

There is illustrated a portion of tire 10 and wheel, upon which there is applied a tire chain 11 of the usual construction including the side chains 12 and cross chains 13 extending outwardly and around the tire at suitable intervals. The side chains have end portions 14 to be locked together or connected, this being acomplished in the present instance by a locking device 15 now to be described. The locking device comprises a casing 16 of rectilinear form including two sides 17 connected so as to close the casing at one end as at 18, its other edges being open except for an integral joining back portion 19 extending a short distance between the sides 17 at the back of the casing adjacent the closed end. The closed end of the casing includes a tongue 18 formed integrally with and extended longitudinally from the connecting part 19, and under the tongue 18 there are overlapped flanges 20, from the sides 17 a terminal link 21 of the chain 12 having a stem portion engaged through the tongue and flanges and riveted as at 22. Pivoted in the far end of the casing from the link 21 there is a pair of rectangular cheek plates 23, having a suitable pin 24 extended therethrough and upset to hold the sides of the casing together as well as to form a pivot for the plates 23. The plates 23 are also connected by a pivot pin 25, in the diagonally opposite corners of the plates, the first named pivot being so located that the plates may be moved within the casing 17 striking against the back 19. In the plates 23 and adjacent their rear edges when the device is closed, as shown in Fig. 2, there is a stud rivet 26. A pivoted lock block 28 is mounted upon the pin 25, this block having an operating handle 29, terminating in a hook 30 which when the parts are in closed position has its bill located closely adjacent the end edge of the casing 16 opposite the link 21 and in line therewith. The block 28 is formed with a bayonet slot 31 the entrance to which is alined with the inner side of the handle 29. Formed in one of the cheek plates 23 there is a curved slot 32, one end of which passes over the slot 31 when the parts are in closed position, the slots 32 extending toward the pivot pin 24 from this point of intersection. Concentric with the slot 32 there is pivotally mounted in one cheek plate a key 33, substantially U-shaped, having a short arm pivoted in the plate 23 and a long arm extended inwardly through the slot 32 for oscillation therein. The casing 17 is suitably sloted at 34 on one side in alinement with the slot 32 and also to receive the base or pivoted part of the key element when the parts are moved into closed position, a communicating slot 35 extending outwardly to the edge of the casing 17 in the direction of movement of the key under pivotal opening movement of cheek plates, as indicated in Fig. 3.

Figure 1:
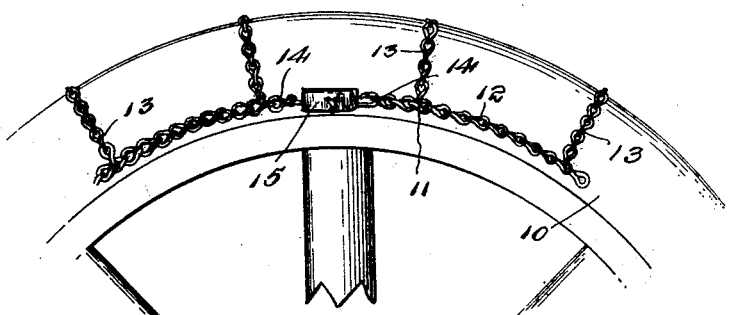
Figure 5:
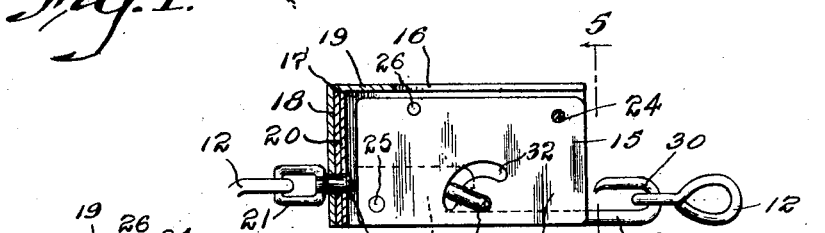
Fig. 5 is an end view partly in section, on the line 5—5 of Fig. 2.
Figure 4:
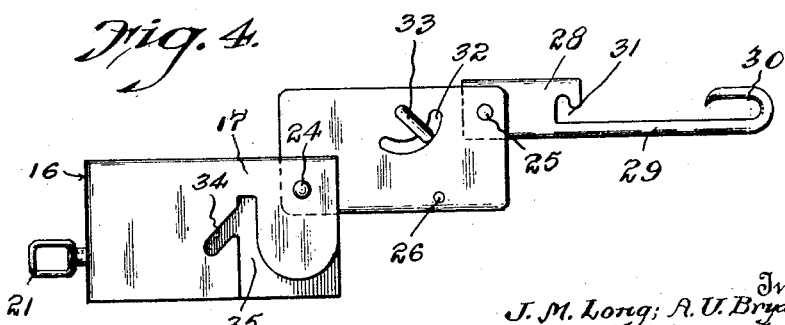
Fig. 4 is a similar view showing the device completely open.

It will be noted that with the construction described when the parts are in closed position as shown in Fig. 2, the hook member 30 may be pressed inwardly between the cheek plates 23 so that the opening of the bayonet slot 31 is moved into line with the slot 32 and the slot 34 in the casing, with the key positioned with its long arm in the outer or right hand part of the slot 32, it may then be swung so as to enter the slot 31, and upon release of the hook 30 the tension of the chain will bear the lock 28 outwardly engaging the long arm of the key 33 at the inner part of the bayonet slot, from which it cannot be moved until the hook 30 is again pressed inwardly. In use, a chain 12 having its ends engaging respectively with the link 21 and hook 30 as shown in Fig. 1, the device may be opened by pressing the hook 30 inwardly and operating the key member as described, after which the cheek plate element may be swung outwardly as in Fig. 3 until the parts reach the position indicated in Fig. 4, the hook member 30 being extended longitudinally outward from the cheek plate 23, which will permit detachment of the chain ends therefrom, if desired.

The uses and advantages of the device will be apparent, and the simplicity of its construction obvious.

What is claimed:

1. In a device of the character described, a casing element, a second element pivoted at one end therein and adapted to be swung into longitudinally extended relation, a third member pivoted on the second named member adapted to similar movement, all the parts being movable into nesting relation, chain connections at outer ends of the first and third named members, a bayonet slot opening outwardly in the third named member, an arcuate slot in the second named member, a key pivoted on the second named member concentric with the slot and having an arm extended therethrough adapted to engage in said bayonet slot at times, the first named member being slotted to permit movement of the key therein and the said arcuate slot when the parts are closed, for the purposes described.

2. In a device of the character described, three elements pivotally connected end to end and movable into overlapped nested relation, a key member pivoted on one element having an arm extending through the other two at times, said other two having slots to engage the arm in opposition to opening movement of the parts, the key being movable therein, for release of the parts, and chain connecting means on the outer of said three elements.

In testimony whereof we have affixed our signatures in presence of two witnesses.

JACOB M. LONG.
A. U. BRYANT.
CHARLES A. BRYANT.

Witnesses:
J. A. MARSH,
W. E. GILLEY.